F. G. TAYLOR.
HUB CAP.
APPLICATION FILED APR. 18, 1918.
1,283,967.
Patented Nov. 5, 1918.
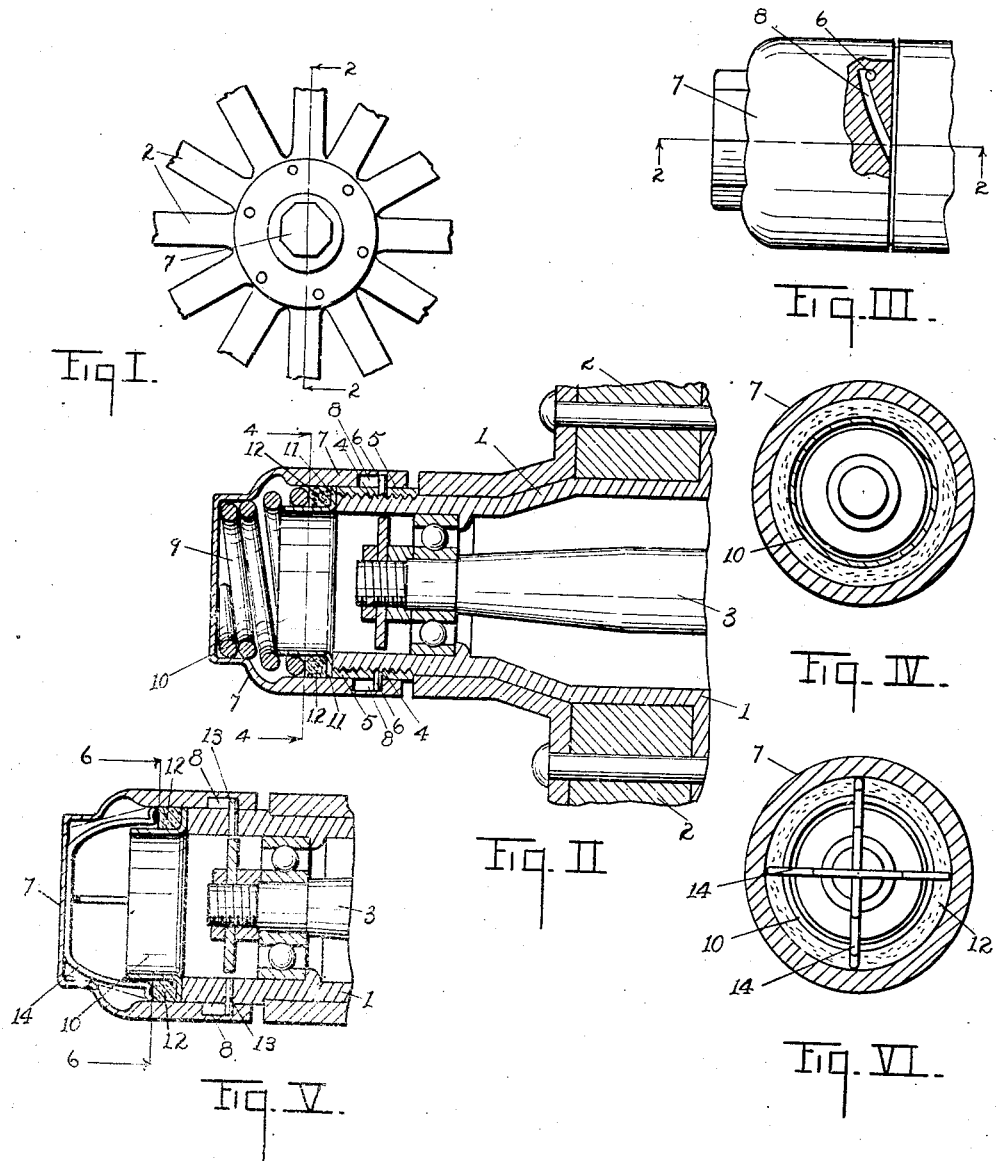
Inventor
FRANK G. TAYLOR
By Chappell & Earl
Attorneys

UNITED STATES PATENT OFFICE.

FRANK G. TAYLOR, OF STURGIS, MICHIGAN.

HUB-CAP.

1,283,967.  Specification of Letters Patent.  Patented Nov. 5, 1918.

Application filed April 18, 1918. Serial No. 229,257.

*To all whom it may concern:*

Be it known that I, FRANK G. TAYLOR, a citizen of the United States, residing at Sturgis, county of St. Joseph, State of Michigan, have invented certain new and useful Improvements in Hub-Caps, of which the following is a specification.

This invention relates to improvements in hub caps.

The main objects of this invention are:

First, to provide an improved hub cap which may be very quickly applied or removed and when applied is securely retained and also effectively retains the lubricant.

Second, to provide an improved hub cap adapted to be substituted for hub caps now extensively used on motor vehicles, such as the Ford.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a side elevation of a wheel embodying the features of my invention, the outer portion of the wheel being broken away.

Fig. II is a detail longitudinal section on a line corresponding to line 2—2 of Figs. I and III, the axle and certain other of the parts being shown in full lines.

Fig. III is a detail side elevation of the hub, with parts broken away to better show structural features.

Fig. IV is a transverse section through the hub cap on a line corresponding to line 4—4 of Fig. II.

Fig. V is a detail longitudinal section similar to that of Fig. II of a modified structure.

Fig. VI is a sectional view on a line corresponding to line 6—6 of Fig. V.

In the drawing similar reference characters refer to similar parts throughout the several views, and the sectional views are taken looking in the direction of the little arrows at the ends of the section lines.

Referring to the drawing, 1 designates the hub, 2 the spokes of a vehicle wheel of well-known type, and 3 the axle. The hub 1 in the embodiment shown in Fig. II is threaded at 4 to receive the usual threaded hub cap. Where my improved hub cap is designed as a substitute for the threaded caps commonly employed, as is the case in the embodiment shown in Fig. II, I provide a sleeve 5 which is threaded upon the hub in lieu of the usual cap. This sleeve carries joint lugs 6. The cap 7 is adapted to embrace the sleeve. The cap is provided with internal bayonet joint grooves 8 adapted to coact with the lugs 6 in the well-known manner.

Within the cap 7 I arrange a coiled spring 9 so that it is placed under stress when the joint members are engaged and acts to retain them in engagement.

In the inner end of the spring 9 is a thimble-like packing member 10 having an outwardly projecting flange 11 at its inner end bearing against the end of the hub. Between the spring and this flange I arrange a packing ring 12, the spring serving to expand this packing ring into engagement with the cap, thereby making a suitable lubricant tight joint.

In the modification shown in Fig. V the joint lugs 13 are mounted directly upon the hub. The cap is provided with bayonet joint grooves 8 coacting with these lugs. Bowed springs 14 are employed in this embodiment instead of the coiled spring 9 of Fig. II. The packing member 10 is carried by these springs 14 and the packing ring 12 is supported in substantially the same manner as in Fig. II.

The embodiment shown in Fig. V is the preferred embodiment where my improvements are used in structures built in a factory to contain my improvements, the embodiment in Fig. II being employed when my improvements are applied to hubs originally designed for threaded caps.

My improved hub cap is quickly applied or removed and when in position is securely retained and also effectively retains the lubricant.

I have not attempted to illustrate or describe various embodiments or adaptations to other forms of hubs as I believe the disclosure made will enable those skilled in the art to which my invention relates to embody or adapt the same as may be desired.

Having thus described my invention, what I claim as new and desire to secure by Letters Patent, is:

1. In a structure of the class described, the combination of a threaded hub, a sleeve threaded thereon and provided with joint lugs, a cap having internal bayonet joint grooves coacting with said lugs, a coiled spring disposed in said cap so that it is under stress when the joint members are engaged and acts to retain them in engagement, a packing member projecting into the inner end of said spring and having an outwardly projecting flange at its inner end bearing against the end of the hub, and a packing ring disposed on said packing member between its flange and the end of the spring.

2. In a structure of the class described, the combination of a hub provided with joint lugs, a cap having internal bayonet joint grooves coacting with said lugs, a coiled spring disposed in said cap so that it is under stress when the joint members are engaged and acts to retain them in engagement, a packing member projecting into the inner end of said spring and having an outwardly projecting flange at its inner end bearing against the end of the hub, and a packing ring disposed on said packing member between its flange and the end of the spring.

3. In a structure of the class described, the combination of a hub, a cap, said cap and hub having coacting bayonet joint members, a spring disposed in said cap and acting to hold said joint members in engagement, a packing member carried by said spring and having an outwardly projecting flange at its inner end, and a packing ring disposed between said flange and spring.

4. In a structure of the class described, the combination of a threaded hub, a sleeve threaded thereon and provided with joint lugs, a cap having internal bayonet joint grooves coacting with said lugs, a spring disposed within said cap to be placed under compression when said joint members are engaged, and a packing means supported by and acted upon by said spring.

5. In a structure of the class described, the combination of a hub provided with joint lugs, a cap having internal bayonet joint grooves coacting with said lugs, a spring disposed within said cap to be placed under compression when said joint members are engaged, and a packing means supported by and acted upon by said spring.

6. In a structure of the class described, the combination of an externally threaded hub, an internally threaded sleeve thereon and provided with exterior joint lugs, a cap having internal bayonet joint grooves coacting with said lugs, and a coiled spring disposed in said cap so that it is under stress when the joint members are engaged and acts to retain them in engagement.

7. In a structure of the class described, the combination of an externally threaded hub, an internally threaded sleeve thereon and provided with exterior joint lugs, and a cap having internal bayonet joint grooves coacting with said lugs.

8. In a structure of the class described, the combination of a hub and a cap removably sleeved upon said hub, said hub and cap having coacting bayonet joint members, a packing means arranged within said cap for preventing the escape of lubricant between the hub and cap, and a spring means for retaining said hub and cap joint members in engagement.

9. In a structure of the class described, the combination of a hub and a cap removably sleeved upon said hub, said hub and cap having coacting bayonet joint members, and a packing means arranged within said cap for preventing the escape of lubricant between the hub and cap.

In witness whereof I have hereunto set my hand and seal in the presence of two witnesses.

FRANK G. TAYLOR. [L. S.]

Witnesses:
THEO. T. JACOBS,
ELLEN M. KELLEY.

Copies of this patent may be obtained for five cents each, by addressing the "Commissioner of Patents, Washington, D. C."